US006923493B2

(12) United States Patent
Buchholz et al.

(10) Patent No.: US 6,923,493 B2
(45) Date of Patent: *Aug. 2, 2005

(54) TRAILER WITH SIDE WALL HAVING LAMINATE PANEL

(75) Inventors: Mark A. Buchholz, Brazil, IN (US); John R. Palm, Brazil, IN (US); Charles R. Fetz, Savannah, GA (US); John M. Jones, Bloomingdale, GA (US)

(73) Assignee: Great Dane Limited Partnership, Chicago, IL (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/260,030

(22) Filed: May 22, 2003

(65) Prior Publication Data

US 2004/0256887 A1 Dec. 23, 2004

Related U.S. Application Data

(63) Continuation of application No. 09/954,709, filed on Sep. 17, 2001, now Pat. No. 6,652,018.

(51) Int. Cl.$^7$ .......................... B62D 33/023; B62D 63/08
(52) U.S. Cl. ................... 296/186.1; 296/191; 52/783.1; 52/800.11
(58) Field of Search ........................... 296/181.1, 181.2, 296/182.1, 186.1, 186.2, 191; 52/787.12, 783.1, 790.1, 800.11, 800.12

(56) References Cited

U.S. PATENT DOCUMENTS

| | | |
|---|---|---|
| 3,141,697 A | 7/1964 | Tenenbaum et al. |
| 3,376,063 A | 4/1968 | Hulverson |
| 3,393,920 A | 7/1968 | Ehrlich |
| 3,547,483 A | 12/1970 | Ehrlich |
| 3,552,329 A | 1/1971 | Parris |
| 3,692,349 A | 9/1972 | Ehrlich |
| 3,815,500 A | 6/1974 | Glassmeyer |
| 4,015,876 A | 4/1977 | Hulverson et al. |
| 4,065,168 A | 12/1977 | Gregg |
| 4,212,405 A | 7/1980 | Schmidt |
| 4,214,789 A | 7/1980 | Katz et al. |
| 4,252,067 A | 2/1981 | Stark |
| 4,420,183 A | 12/1983 | Sherman |
| 4,498,264 A | 2/1985 | McCafferty et al. |
| 4,592,585 A | 6/1986 | Oren et al. |
| 4,810,027 A | 3/1989 | Ehrlich |
| 4,904,017 A | 2/1990 | Ehrlich |
| 5,041,318 A | 8/1991 | Hulls |
| 5,058,756 A | 10/1991 | Green |
| 5,112,099 A | 5/1992 | Yurgevich et al. |
| 5,195,800 A | 3/1993 | Stafford et al. |
| 5,433,501 A | 7/1995 | Thomas et al. |
| 5,439,266 A | 8/1995 | Ehrlich |
| 5,507,405 A | 4/1996 | Thomas et al. |
| 5,509,714 A | 4/1996 | Schmidt |
| 5,584,252 A | 12/1996 | Smith et al. |
| 5,584,527 A | 12/1996 | Sitter |
| 5,664,826 A | 9/1997 | Wilkens |
| 5,690,378 A | 11/1997 | Romesburg |
| 5,772,276 A | 6/1998 | Fetz et al. |
| 5,860,693 A | 1/1999 | Ehrlich |

(Continued)

OTHER PUBLICATIONS

Technical Data 65025 for Kemply® Laminated Panel Product Line with Surfaseal (1 sheet).

*Primary Examiner*—Patricia L. Engle
(74) *Attorney, Agent, or Firm*—Nelson Mullins Riley & Scarborough, LLP

(57) ABSTRACT

A cargo trailer includes a floor and a side wall extending vertically upward from a side edge of the floor. The side wall includes at least one vertical post. A pair of adjacent liner panels, formed from a tough material attached to a stiff backer, attach to the post.

25 Claims, 12 Drawing Sheets

U.S. PATENT DOCUMENTS

| | | |
|---|---|---|
| 5,934,742 A | 8/1999 | Fenton et al. |
| 5,938,274 A | 8/1999 | Ehrlich |
| 5,992,117 A | 11/1999 | Schmidt |
| 5,997,076 A | 12/1999 | Ehrlich |
| 6,003,932 A | 12/1999 | Banerjea et al. |
| 6,010,020 A | 1/2000 | Abal |
| 6,199,939 B1 | 3/2001 | Ehrlich |
| 6,311,456 B1 | 11/2001 | Rodero Antunez |

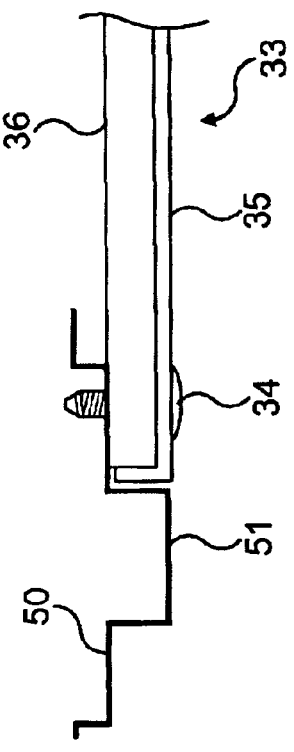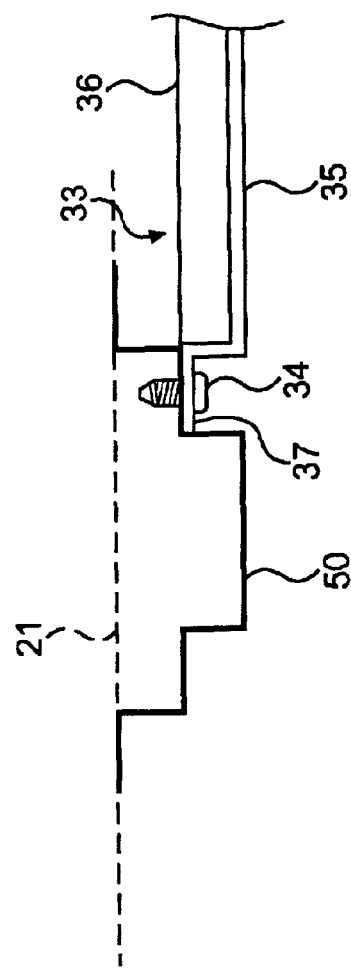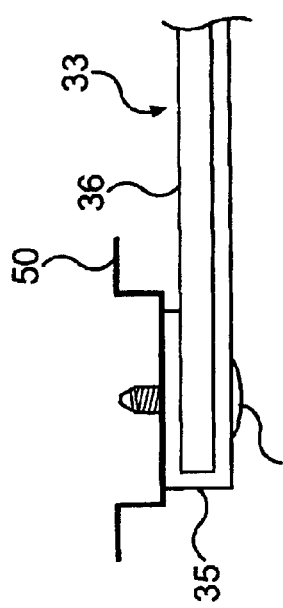

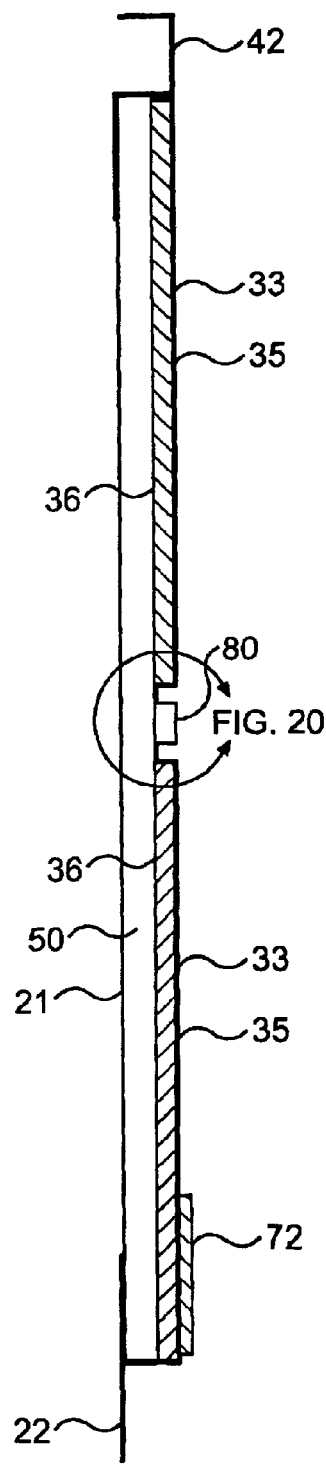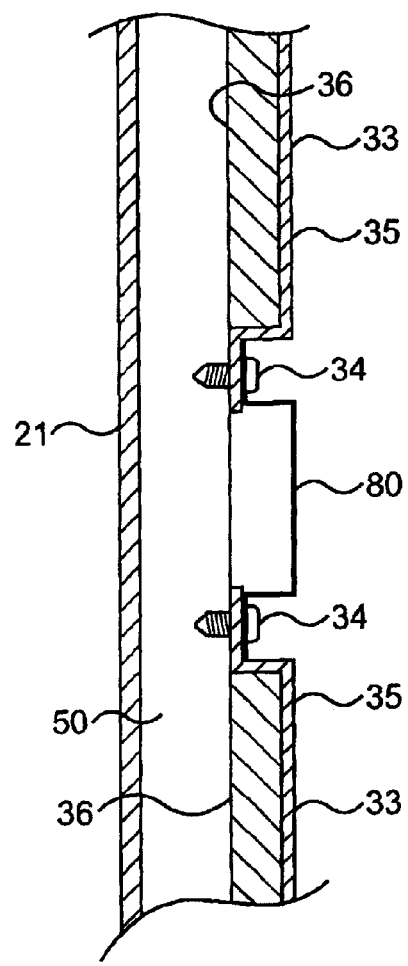
FIG. 19
FIG. 20

TRAILER WITH SIDE WALL HAVING LAMINATE PANEL

This is a continuation of U.S. application Ser. No. 09/954,709 filed Sep. 17, 2001 now U.S. Pat. No. 6,652,018, the entire disclosure of which is incorporated by reference herein.

BACKGROUND OF THE INVENTION

A wide variety trailers are known for carrying cargo. For example, van type trailers typically include a deck assembly supported by a side wall structure, wheels and front legs. The deck assembly may include longitudinal floor boards and transverse cross-members, such as I-beams, extending between opposing bottom rails. The deck transfers its load to the bottom rails, wheels, and, depending upon whether or not the trailer is coupled to a tractor or is free-standing, to a tractor fifth wheel or to retractable front legs on the trailer.

In a monocoque type trailer, individual interior side wall panel members and an outer skin are joined together, often by a post, channel or zee-shaped structural member, and to a suspension subframe to form a self-supporting body construction. The outer skin and inner panel members may carry some of the stresses between the posts, floor and roof of the trailer. For example, it is known for the interior panels and the outer skin to attach to a plurality of vertical posts spaced apart along the trailer side wall. Referring to the cross-sectional view of a prior art vertical post shown in FIG. 1, a vertical post 1 includes a longitudinal central section 2 and a pair of first longitudinal flanges 3 disposed on either side of central section 2 and recessed from central section 2 between the central section and an outer skin 4. The outer skin is fastened to a pair of second longitudinal flanges 5 by any suitable means, such as rivets (not shown). Side wall liner panels 6 are attached to the posts at first longitudinal flanges 3 by tapit pins 7, screws or other suitable means.

It is known to include a scuff band along the interior surface of a trailer wall to prevent damage to the wall when cargo is loaded into or removed from the trailer. If provided, the protective scuff band generally protrudes into an otherwise useable storage area within the trailer.

Most side wall liner panels may be generally classified as being either stiff or flexible. Stiff panels, for example made of 0.25" plywood, resist deflection. Thus, although such a panel may be subject to damage itself, it tends to protect the outer skin from dents from the inside. Flexible panels, for example made of fiber reinforced plastic ("FRP"), glass reinforced plastic ("GRP") or other polymer sheet or 0.019"–0.027" steel sheet, deflects easily from interior impacts and tends to snap back into its original condition. It therefore tends to avoid damage, although it may more easily transmit an impact outward to the aluminum outer skin.

A laminate inner panel material sold under the name KEMPLY is formed of a thin, fiber reinforced plastic facer bonded to a thicker, more rigid, plywood substrate, or "backer." The FRP facer and plywood backer extend over the panel's entire area, from side to side and top to bottom. The facer and backer end at the same edge at the vertical posts and are attached to the posts directly through the facer and backer.

A panel generically known as "plymetal" includes steel and/or aluminum facers bonded to both sides of a thick, e.g. greater than 0.75", plywood core. Plymetal panels are used for trailer rear doors due to their stiffness, strength and durability.

Composite trailers differ from sheet and post constructions in that composite trailers typically do not have a separate liner panel covering the interior side wall surface. Instead, a single panel defines both the interior and exterior surfaces. It is known, for example, to form composite panels from FRP or steel facers bonded to both sides of a plywood, plastic or polyurethane foam core. A plurality of adjacent panels attached to each other at their side edges and extending down the trailer's side forms the side wall. Other constructions are also known, for example trailers having side walls formed of unitary metal or unitary plywood coated on either side with fiberglass and glass.

The present invention recognizes and addresses the foregoing considerations, and others, of prior art construction and methods. Accordingly, it is an object of the present invention to provide an improved trailer.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 15 is a partial cross-sectional view of a side wall liner panel constructed in accordance with an embodiment of the present invention;

FIG. 16 is a partial cross-sectional view of a side wall liner panel constructed in accordance with an embodiment of the present invention;

FIG. 17 is a partial cross-sectional view of a side wall liner panel constructed in accordance with an embodiment of the present invention;

FIG. 19 is a partial cross-sectional view of a side wall constructed in accordance with an embodiment of the present invention;

FIG. 20 is a partial cross-sectional view of a side wall constructed in accordance with an embodiment of the present invention;

Figure 1:
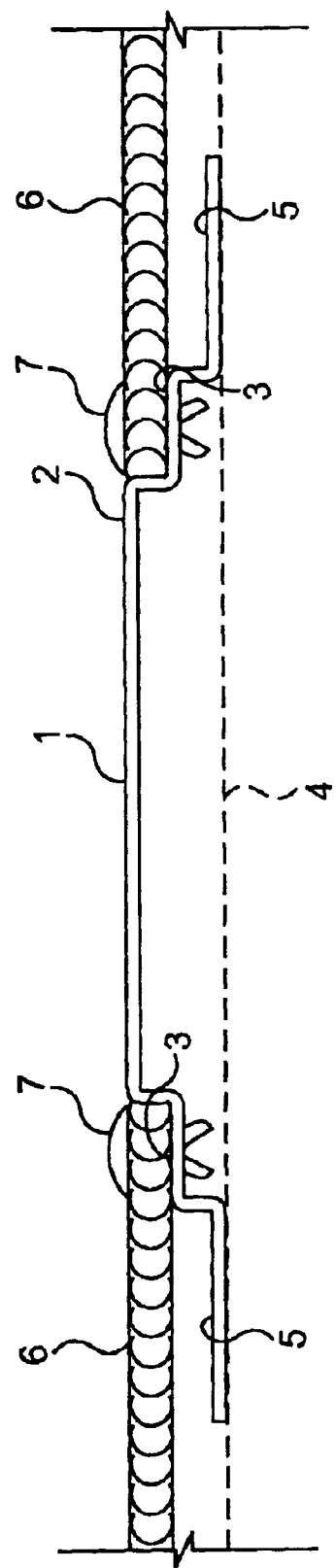
FIG. 1 is a cross-sectional view of a prior art side wall and post.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
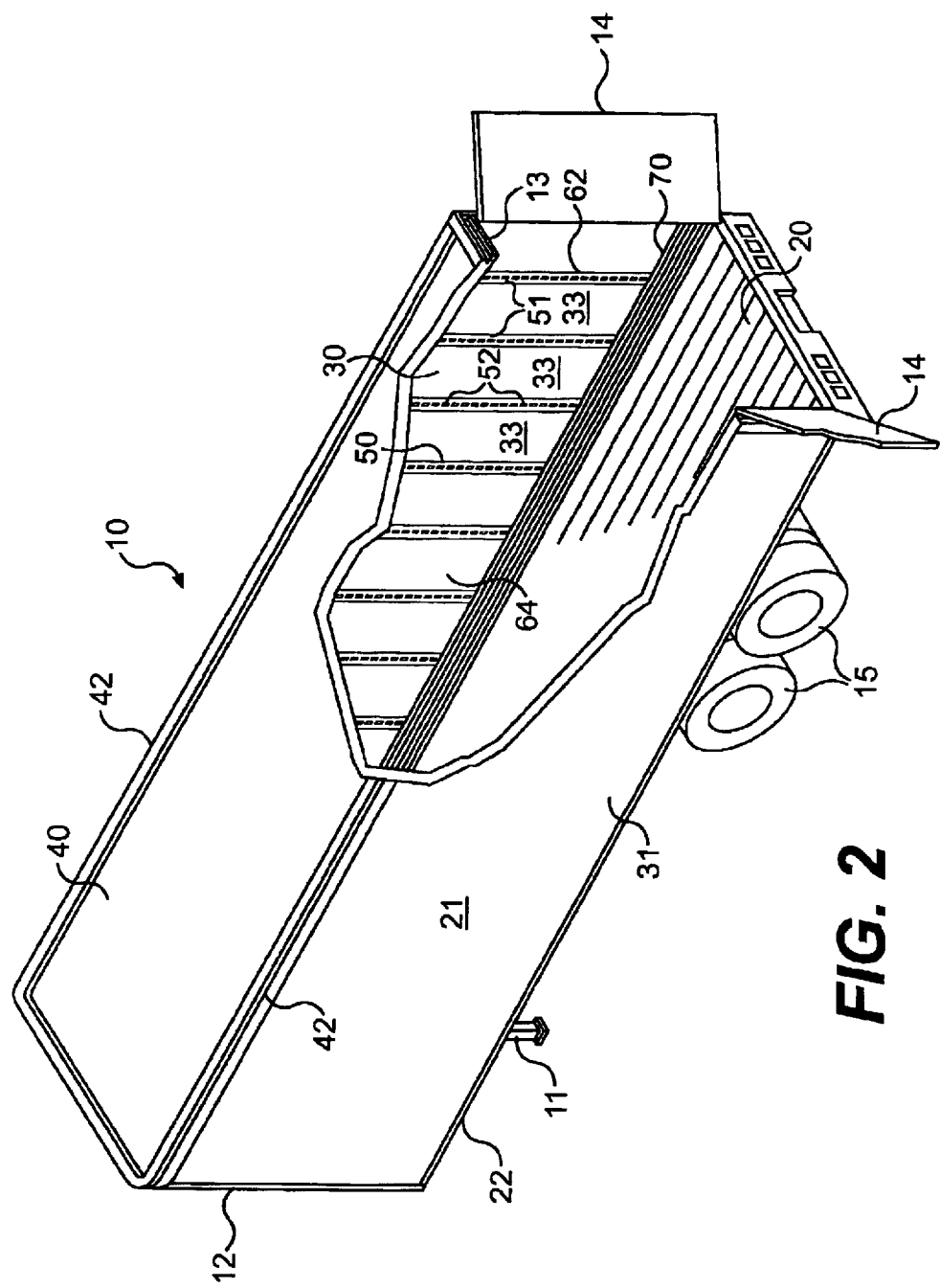
FIG. 2 is a partial perspective view of a trailer constructed in accordance with an embodiment of the present invention.

FIG. 2 illustrates a trailer 10 including a floor 20, two side walls 30 and 31, and a roof 40. Side walls 30 and 31 are identically constructed. Roof 40 is attached to side walls 30 and 31 by top rails 42, and each side wall 30 and 31 is connected to floor 20 by a bottom rail 22, only one of which is shown in FIG. 2. Trailer 10 includes retractable legs 11, a forward end wall 12 and a rearward end frame 13. Once assembled, roof 40, floor 20 and side walls 30 and 31 form a trailer having a generally rectangular cross-section. The distance between the inner surfaces of each side wall 30 and 31 is generally greater than 90 inches, and the distance between the outer surfaces of each side wall 30 and 31 is generally less than 110 inches. A pair of doors 14 at the rearward end of trailer 10 are pivotally connected to rear end frame 13. A plurality of wheels 15 support the rearward end of trailer 10 and facilitate movement of trailer 10 when coupled to a tractor (not shown).

Figure 6:
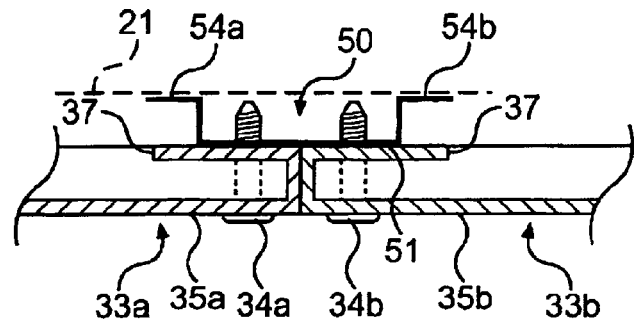
FIG. 6 is a partial cross-sectional view of a side wall constructed in accordance with an embodiment of the present invention.

Side walls 30 and 31 include a plurality of vertical posts 50, a plurality of interior side wall liner panels 33 and one or more scuff bands 70. The liner panels interconnect the posts, and the scuff band is received within a recessed portion, shown in FIG. 3, at the bottom portion of each post. Each post 50 includes a longitudinal front face 51 containing a series of apertures 52 for receipt of cargo straps and the like to secure the trailer contents. In other embodiments, for example as shown in FIG. 6, liner panels 33 may completely cover posts 50 so that the liner panels form the side wall's inner surface without the post faces.

Figure 3:
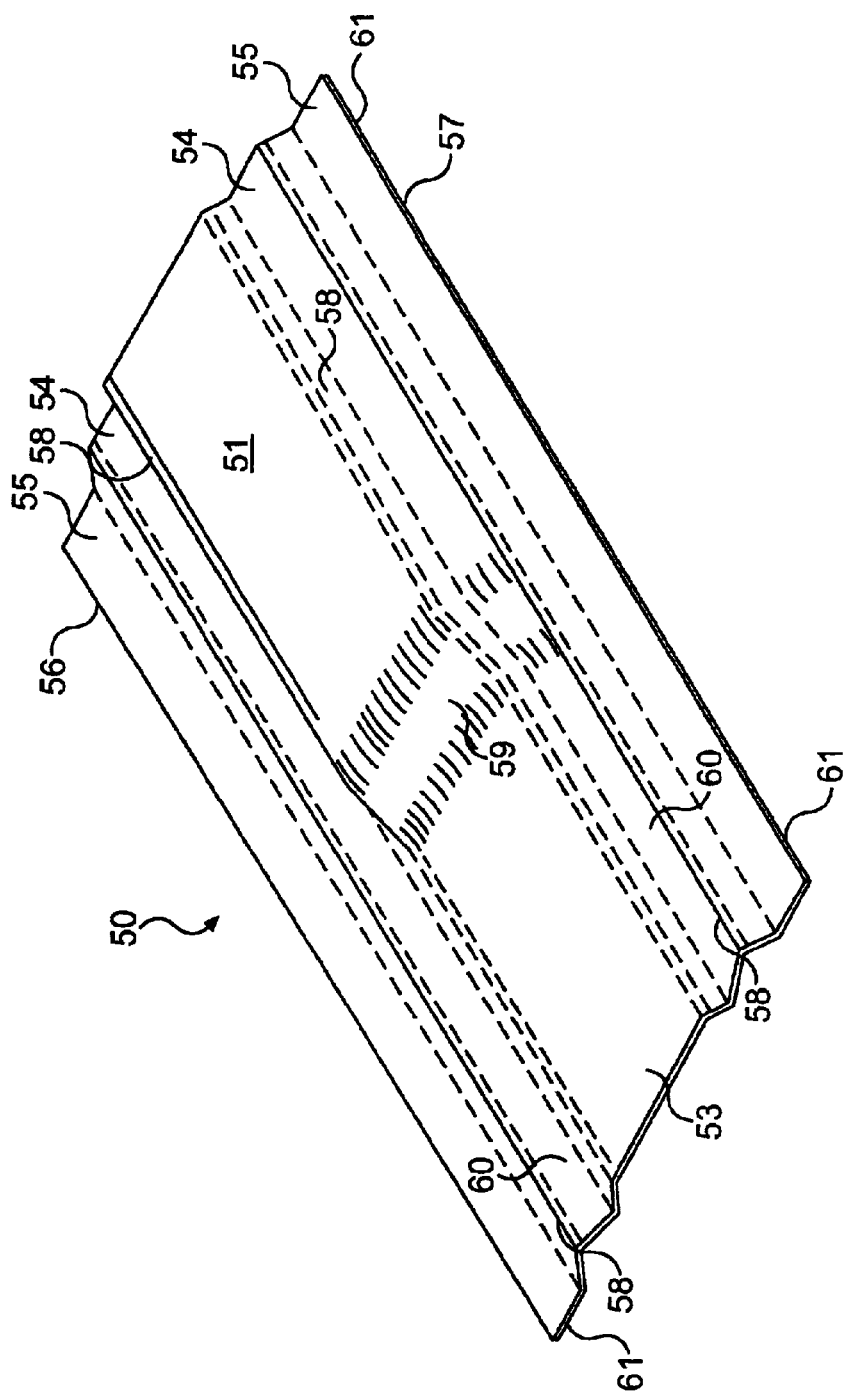
FIG. 3 is a partial perspective view of a recessed post that may be used in the trailer shown in FIG. 2.

Referring now to FIG. 3, an exemplary post 50 includes a recessed lower portion 53 defined in front face 51. Stepped-down pairs of longitudinal flanges 54 and 55 extend out from opposite sides of front face 51 to outer edges 56 and 57 and are parallel to each other and to front face 51. Flanges 54 are recessed approximately one-quarter of an inch from front post face 51 and are connected to front face 51 by lateral edges 58. Flanges 54 and 55 are generally parallel to front face 51. Each flange 55 extends continuously along the length of post 50. In contrast, flanges 54 are parallel to surface 51 and flanges 55 only above a transition section 59. Below transition section 59, flanges 54 bend outward away from the plane defined by front post face 51, allowing portion 53 to recess to a position approximately coplanar with the inward surface of flanges 54 above the transition section.

Because flanges 55 maintain their positions across transition section 59, the movement of front face 51 inward to form recessed portion 53 pivots flanges 54, thereby forming a pair of angled surfaces 60. Edges 58 and post edges 56/57 remain straight and parallel to each other, and the indention of recessed portion 53 does not expand the width of post 50. Outer skin 21 (FIG. 2) may be attached to post 50 along the post's entire length on the rear side of flanges 55, and the post may be attached both to the trailer's top and bottom rails, also along the rear face of flanges 55, at 61. Vertical posts 50 are fastened to the top rails 42 (FIG. 2) and bottom rails 22 of both side walls by suitable means such as rivets, screws or the like. Thus, panels 33 are secured to top rail 42 by their connection to posts 50. The portion of top rail 42 to which posts 50 are fastened extends behind panels 33.

Figure 4:
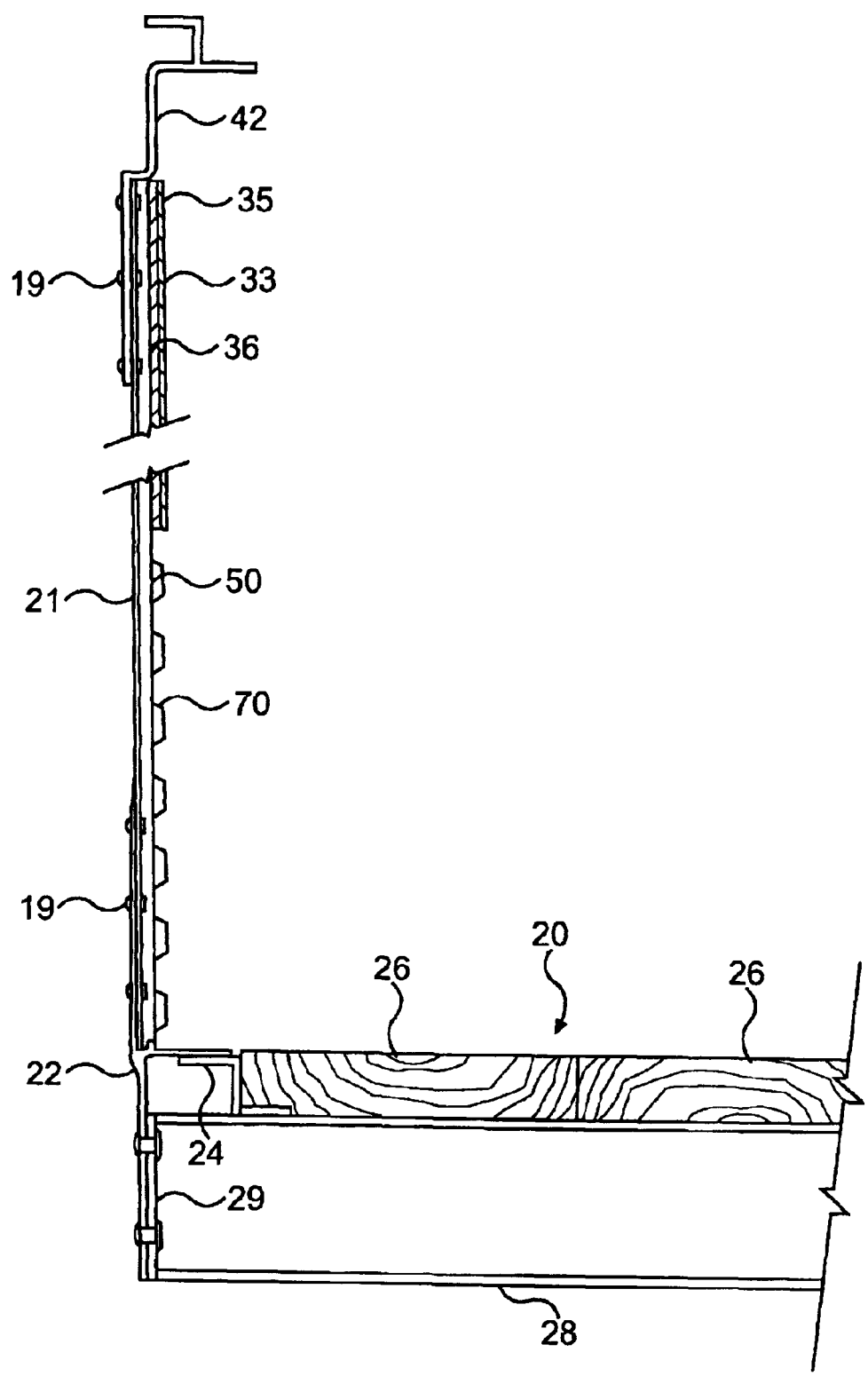
FIG. 4 is a rear cross-sectional view of a floor and side wall of the trailer of FIG. 2.

Referring to FIG. 4, floor 20 includes two longitudinally oriented zee-shaped members 24, only one of which is shown, between bottom rail 22 and longitudinally oriented wooden floor planks 26. Zee-shaped members 24 and floor planks 26 sit on a plurality of transverse I-beams 28. Each I-beam 28 includes end plates 29 fastened to a bottom portion of bottom rails 22 using screws, bolts, rivets, or the like. Wooden planks 26 may be held between opposing zee-shaped members 24 by friction, or the planks may be bolted or otherwise fastened to I-beams 28 and/or zee-shaped members 24. Zee-shaped members 24 may be intermittently attached to bottom rails 22, I-beams 28, and/or planks 26. Outer skin 21 is riveted to vertical posts 50, and posts 50 are riveted to bottom rail 22 and top rail 42, as shown at 19 in FIG. 4.

Referring to FIGS. 2 and 4, outer skin 21 is connected to top rail 42, bottom rail 22, end wall 12 and end frame 13. It should be understood that outer skin 21 may be formed from any tough material, for example steel, aluminum, fiberglass, thermoplastic or other suitable polymer. In the preferred embodiment, outer skin 21 is constructed of a single unitary sheet of "nominal" 050 aluminum, having a thickness of approximately 0.047", and is fastened to vertical posts 50 by rivets or other suitable means.

Figure 5:
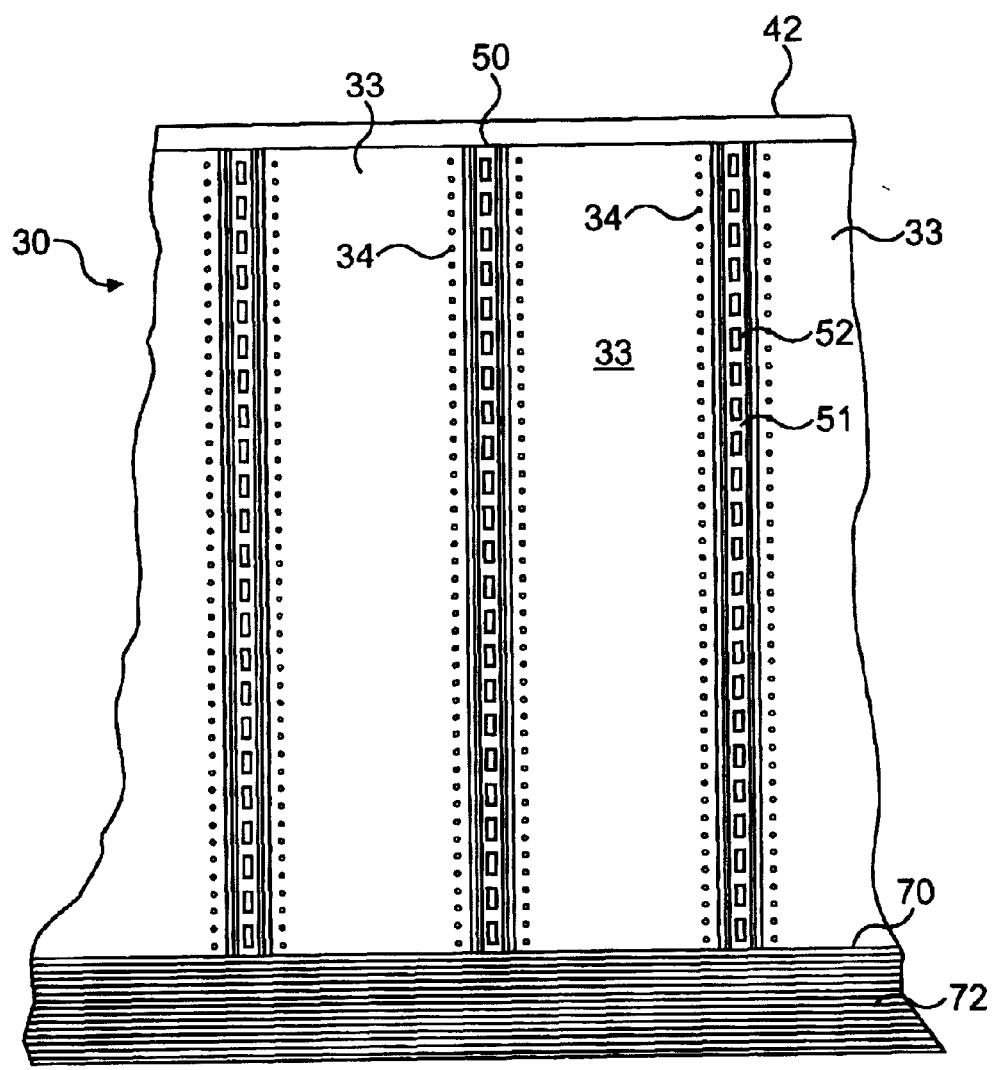
FIG. 5 is a partial plan view of a side wall construction of the trailer of FIG. 2.

As illustrated in FIGS. 2, 4, and 5, scuff band 70 is of a generally corrugated metal construction. However, scuff band 70 may be constructed of any suitable material, for example wood, with or without a protective metal plate attached, or a non-corrugated metal. In the preferred embodiment, scuff band 70 is formed from three-quarter inch laminated hardwood or sixteen gauge galvanized steel corrugated to a one-quarter inch depth. When received by recessed portion 53, at least a portion of scuff band 70 is disposed outward of post front face 51.

Scuff band 70 may be almost entirely outward of the trailer's interior area so that the front surface of scuff band 70 is parallel to post front face 51 above transition section 59. Returning to FIG. 3, flanges 54 above transition section 59 may receive liner panels 33 (FIG. 7) so that liner panels 33, post face 51 and scuff band 70 are coplanar. That is, while there may be slight deviations in the surface, as should be understood in the art, the surface is coplanar from the standpoint of maximizing cargo space in trailer 10. For example, post portion 53 may be recessed by approximately one-quarter inch but receive a half-inch thick scuff band. In this arrangement, only half of scuff band 70 would be outward of the inner side wall. Thus, the front surface 72 of scuff band 70 is inward of the inner side wall, but recessed post 50 nevertheless saves a quarter inch at each wall.

Furthermore, scuff band 70 may be disposed at any suitable position on walls 30 and 31. For example, scuff band 70 may be disposed at the top, middle and/or bottom of walls 30 and 31. Moreover, posts 50 may be recessed wherever it is desired to place scuff band 70, and posts 50 may be recessed at one or more intermediate points to receive one or more scuff bands. In one preferred embodiment, the posts are not recessed. They extend between the floor and roof without recess so that surface 51 extends along each post's entire length. The liner panels attach to either side of a post, as discussed below, and also extend entirely from the floor to the roof. The scuff band runs along the floor over both the posts and the liner panels.

Figure 7:
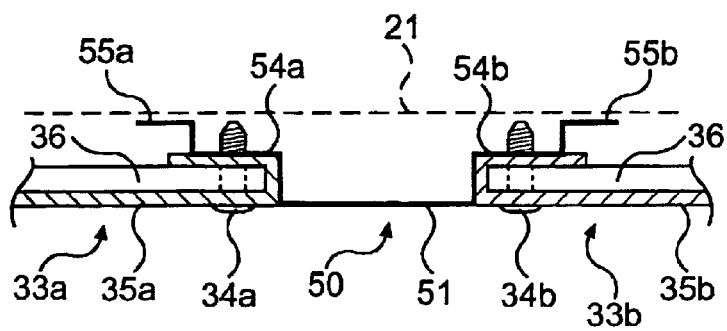
FIG. 7 is a partial cross-sectional view of a side wall constructed in accordance with an embodiment of the present invention.

Referring now to FIGS. 5 and 7, wall 30 (and wall 31) is formed from multiple liner panels 33, which are fastened to posts 50 at 34 by fasteners such as screws, rivets, tapit pins, etc. Each liner panel includes a tough facer 35 bonded to a stiff backer 36. As should be understood in this art, the facer is "tough" in that it is strong and resilient so that it normally dissipates energy when it deforms (for example when receiving a blow by a lift truck, hand trucks or falling cargo during loading or unloading). It is not brittle. In the illustrated embodiments, the facer is formed in a generally planar sheet and may be formed from a variety of suitable materials, for example steel, aluminum, and thermoplastics or other polymers as should be understood in the art, provided that the material is tough.

As compared to the facer, the backer is "stiff" in that it is substantially less ductile than a tough material. It is substantially less tough than the facer, although it is not necessarily (and is preferably not) brittle. It does not deflect as much as the facer against lateral blows. That is, it does not deform and then return to its original form in response to an unshielded blow as would the more resilient facer. As should be understood in this art, toughness is a characteristic of the material, whereas stiffness is a characteristic of the material and its geometry. Thus, depending on the backer's dimensions, various materials displaying various characteristics may be used, provided the backer exhibits stiffness against forces perpendicular to its plane. Suitable materials for the backer include wood, oriented strand board ("OSB"), MESONITE, cardboard, STYROFOAM or fiber reinforced polymers.

Although dimensions may vary, the facer is preferably 0.015" to 0.027" thick, whereas the backer is preferably 0.18" to 0.25" thick. Thus, a less expensive stiff material may be used for the larger backer, while a typically more expensive tough material may be used for the smaller facer. Regardless of the materials used, however, the backer helps the facer maintain its form, while the facer protects the backer from damage.

Figure 10:
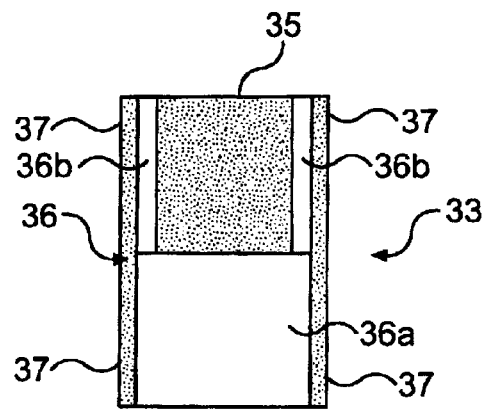
FIG. 10 is a rear plan view of a side wall liner panel according to an embodiment of the present invention.
Figure 11:
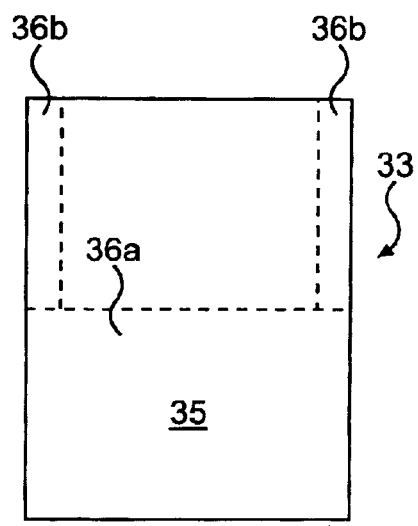
FIG. 11 is a front plan view of the side wall liner panel of FIG. 10.

Referring to the embodiment shown in FIGS. 10 and 11, the backer may be fully or partially omitted in the top half of the side wall. Each panel 33 is formed from a 0.019" thick 80 ksi yield strength galvanized steel sheet 35 bonded to a 4.8 mm-thick MERANTI plywood backer 36. Backer 36 is formed from a rectangular piece of plywood 36a and two plywood strips 36b. Steel sheet 35 is approximately 0.019" thick, 24.63" wide and 96.00" tall. Rectangular plywood 36a is bonded to the lower 48.00" of steel sheet 35 by a urethane adhesive such as a two-part isoset (CX11 and WD3CM402) available from Ashland Specialty Chemical Co. of Columbus, Ohio. It should be understood that other suitable adhesives could be used and that the facer may be attached to the backer by any suitable means.

The backer is 22.63" wide, leaving approximately 1.00" of steel width overhang 37 on either side of the vertical edges of plywood 36a. Wood strips 36b are bonded to the top 48.00" of steel sheet 35 at the edges of plywood section 36a such that the same 1.00" overhang 37 also overhangs the outside vertical edges of strips 36b. Each strip 36b is 2.75" wide by 48.00" tall and 4.8 mm thick. Overhang 37 is then folded over and wrapped around the edges of plywood 36a and wood strips 36b, as shown in FIGS. 6–9 so that it covers a perpendicular side edge of the backer and a portion of the backer's opposite side. It should be understood that in other embodiments, more or less than 1.00" of steel sheet 35 can be left to overhang plywood 36a and strips 36b depending, for example, on the method of installation of panels 33 on posts 50, and that the steel sheet may entirely cover both sides of the backer. Moreover, it should be understood that the panel dimensions are presented herein for purposes of example only and may be varied as suitable and desired. For example, the overall panel dimensions may vary with trailer design considerations. The facer and backer dimensions may also vary, provided those components maintain their respective tough and stiff qualities.

In a typical trailer, partial plywood backer 36 requires approximately ten fewer sheets of plywood than would be needed were a full plywood backer used, translating into a significant weight savings. In trailers, the great majority of liner panel impacts occur at the panel's lower half. Thus, panels 33 as in FIGS. 10 and 11 save weight while providing maximum strength and stability at the high impact area. The reduced weight also eases handling of panels 33 during assembly of walls 30 and 31. It should be understood, however, that other trailer designs and needs may make it desirable to modify the position of the main plywood section, that it may be desirable to use a full backer, and that all such constructions are within the scope of the present invention.

Figure 14:
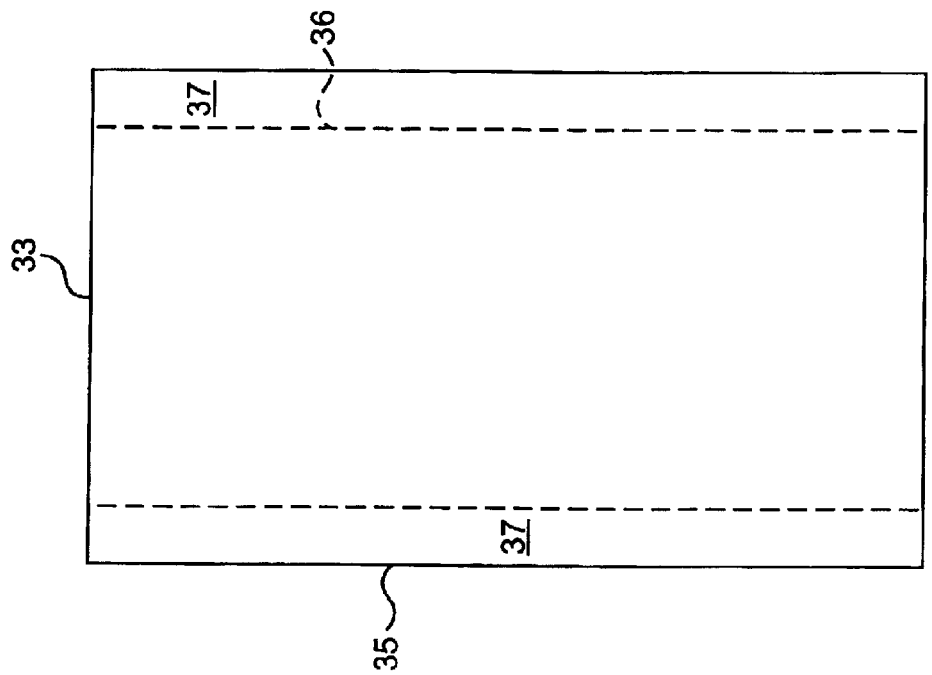
FIG. 14 is a front plan view of the side wall liner panel of FIG. 13.
Figure 13:
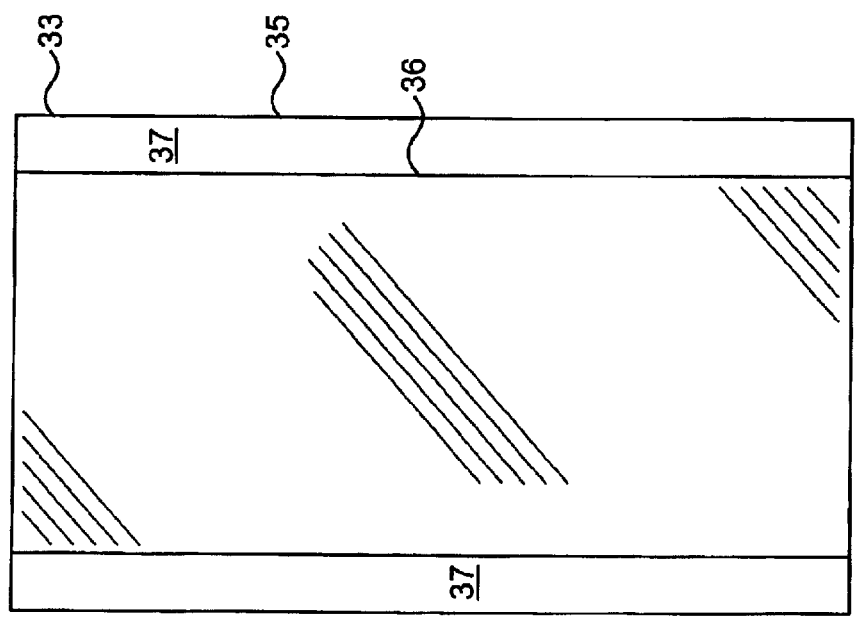
FIG. 13 is a rear plan view of a side wall liner panel according to an embodiment of the present invention.

Accordingly, in another preferred embodiment shown in FIGS. 13 and 14, backer 36 extends along the entire length of liner panel 33. The facer and backer may be made from the same materials and in the same thicknesses as discussed with respect to FIGS. 10 and 11, and overhangs 37 may again wrap around the panel edges.

Referring to FIG. 15, panels 33 are installed and fastened to posts 50 using fasteners 34. As should be clear from the discussion herein, the panels may attach to various suitable post constructions in various suitable manners. Thus, the configurations shown in FIG. 15 is for purposes of explanation only. Since facer 35 wraps around to the opposite side of backer 36, fasteners 34 penetrate the facer, backer 36 (whether in a single sheet as in FIGS. 13 and 14 or in multiple sections as in FIGS. 10 and 11), and overhang portion 37. The double penetration of facer 35 creates a better load path through fasteners 34 and helps the facer remain flat against backer 36 so that the facer does not fray out at the edges away from wood backer 36 in embodiments where the flexibility of the facer material (e.g. steel) would otherwise make the facer susceptible to fraying at a flush edge. The liner panel is held more securely against the backer and is therefore less susceptible to damage by lift trucks or other loading apparatus.

In general, the fold-over of the overhang, whether the overhang wraps around to the backer's opposite side or not, protects against facer fraying and reduces the likelihood that cargo will snag against a cut facer edge and pull the facer away from the backer. This also protects the cargo in that the fold-over provides a more blunt surface than a sharp edge and prevents damage that might occur from scraping against a snagged facer.

In other embodiments, the facer does not wrap around to the backer's opposite side. Referring to FIG. 16, for example, liner panel 33 is received in a side flange of post 50. Facer 35 again extends beyond the edge of backer 36, but in this case folds only over the backer's side edge surface without wrapping around the opposite side. Although not shown, a similar panel is received by the post in the flange on the opposite side of post front face 51.

Furthermore, as shown in FIG. 17, facer 35 may also bend outward away from the backer, as opposed to wrapping around the backer's opposite side. Here, overhang 37 attaches to a side flange of post 50 by screws 34, thereby securing liner panel 33 to post 50. Although not shown in FIG. 17, a similar panel 33 is attached to the corresponding flange on the opposite side of post 50.

Figure 9:
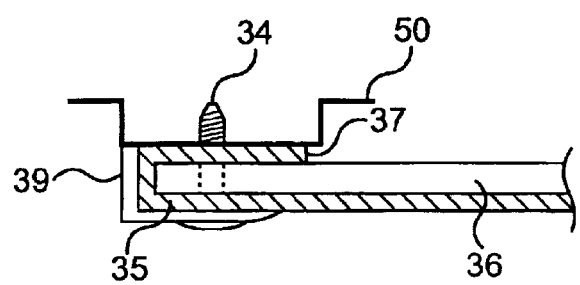
FIG. 9 is a partial cross-sectional view of a liner panel constructed in accordance with an embodiment of the present invention.
Figure 12:
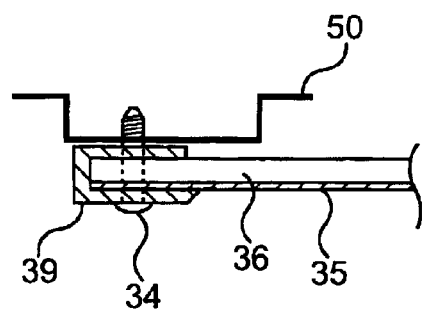
FIG. 12 is a partial cross-sectional view of a side wall liner panel constructed in accordance with an embodiment of the present invention.

In addition to wrapping facer 35 around the edges of backer 36, an "L" shaped clamp strip 39 may be installed to protect the edge of panel 33, as shown in FIG. 9. Clamp strip 39 may take various shapes, for example that of an "L," "C," or "H," and may be installed along the vertical and/or horizontal edges of panels 33. It may be made in various suitable constructions such as 0.050" thick extruded aluminum or molded plastic. Such clamp strips may also be used where facer 35 does not wrap around the backer edges, for example where the sheet and the backer cut off evenly at the same edge surface as shown in FIG. 12, in which a "C" shaped clamp strip is used. Such a panel may be used, for example, at the rear of the side wall next to the trailer doors, and other liner panel arrangements as discussed herein may be used forward of the rear panel. In these embodiments, the clamp strips help secure the facer against the backer similarly to the facer wrap-around discussed above.

In the embodiment illustrated in FIG. 7, panel 33a fastens to post 50 at the recess formed by the stepped-down flange 54a. The panel is fastened to the flange by multiple fasteners 34a along the panel's length. Similarly, an adjacent panel 33b is fastened by multiple fasteners to the post at the recess formed by stepped-down flange 54b. In this configuration, the surface of panels 33a and 33b and post face 51 are coplanar, forming a smooth interior wall in trailer 10 (FIG. 2). This configuration also allows posts 50 to define apertures 52 (FIG. 2) in face 51 so that cargo tie-down straps can be used. Post 50 includes two additional stepped-down longitudinal flanges 55a and 55b that are offset from flanges 54a and 54b and to which outer skin 21 fastens to form the trailer's exterior.

It should be understood, however, that the present invention encompasses various post and panel configurations. Referring to FIG. 6, for example, post 50 is hat shaped and includes a front face 51 and two stepped-down longitudinal flanges 54a and 54b located on either side of front face 51. Panels 33a and 33b are fastened directly to front face 51 using multiple fasteners 34a and 34b so that the edges of panels 33a and 33b abut one another. Outer skin 21 is attached to rear surface of flanges 54a and 54b. In this configuration, the surfaces of sheet 35a and 35b on panels 33a and 33b are coplanar to each other, forming a smooth interior surface. In this and other arrangements, the post need not necessarily be a unitary structure. In FIG. 6, for example, post 50 may comprise separate, adjacent vertical post sections so that each of panels 33a and 33b attach to a respective section.

Figure 22:
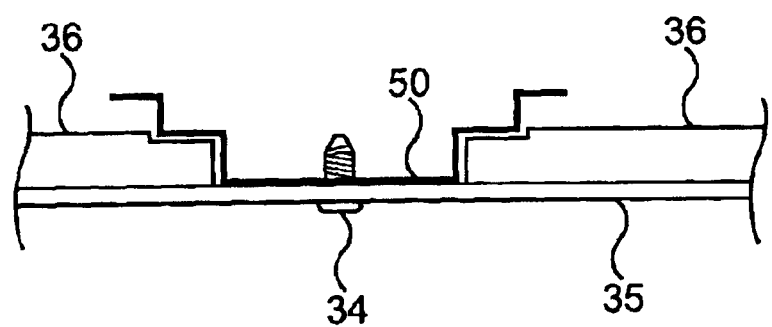
FIG. 22 is a partial cross-sectional view of a side wall liner panel constructed in accordance with an embodiment of the present invention.

In another example, and referring to FIG. 22, the liner panel backers are received by a respective side flanges of vertical posts 50. The backers share a common facer 35 so that the facer passes over the front surface of all vertical posts in the side wall. In construction, the facer sheet may be cut to its desired dimensions so that it extends the entire length of the side wall inner surface. The backers are then bonded to the back side of the facer and spaced apart by intervals equal to the width of the posts. The liner panels are then mounted together onto the posts by fasteners 34, and a scuff band may be attached to the liner panels and/or the vertical posts.

Referring to FIG. 6, it should also be understood that the panels may include clamp strips along their vertical edges. For example, an "H" shaped clamp strip may be disposed between the opposing liner panel edges so that the two open ends of the "H" receive the liner panel edges, which abut the center of the "H." As discussed above with respect to FIGS. 9 and 12, the facer of each liner panel in such an embodiment may wrap around the liner edges, as shown in FIG. 6, or may stop evenly with the backer edge, as shown in FIG. 12. Also, it should be understood in these embodiments that the same clamp strip acts as the clamp for each adjacent panel.

Figure 8:
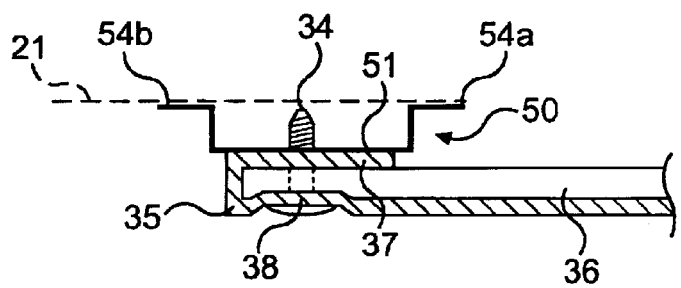
FIG. 8 is a partial cross-sectional view of a liner panel constructed in accordance with an embodiment of the present invention.

The heads of fasteners 34a and 34b, in this case screws, may extend out from this surface as illustrated in FIG. 6 but could also be countersunk into recesses 38 formed in both facer 35 and backer 36 of liner panels 33 so that the heads are at or below the panel surfaces, as shown in FIG. 8. Each of a plurality of recesses 38 may be formed by crushing, cutting, milling, drilling or sanding backer 36, or backer 36 and facer 35 together, such that the liner's thickness at recess 38 is reduced. Furthermore, the entire length of the panel's vertical edges may be recessed by similar means so that other components, such as attaching fasteners or clamp strips (like clamp strip 39 in FIG. 9), may be mounted flush with the main surface of sheet 35, thereby maintaining a smooth surface on walls 30 and 31.

In a preferred embodiment, the backer and facer are attached to each other, and the recesses or recess line are then formed by a die set. Because the facer is deformed but not cut at the recess, the fasteners maintain their connection to the facer at the side wall's inner surface.

As discussed above, and referring to FIG. 5, vertical posts 50 may be recessed at their bottom ends to receive a scuff band 72. In these embodiments, liner panels 33 may end at the scuff band's top edge. Alternatively, however, while the backer may end at the scuff band, the facer may extend beyond the backer edge, and the excess facer may be folded behind the scuff band. In the latter embodiment, the excess facer material tends to avoid cargo snags at the interface between the liner and the scuff band.

In another preferred embodiment as discussed above, vertical posts 50 are not recessed. Here, liner panels 33 may extend from top rail 42 entirely to the trailer floor. Scuff band 72 runs along the trailer floor over posts 50 and liner panels 33 and is attached to the posts.

Figure 18:
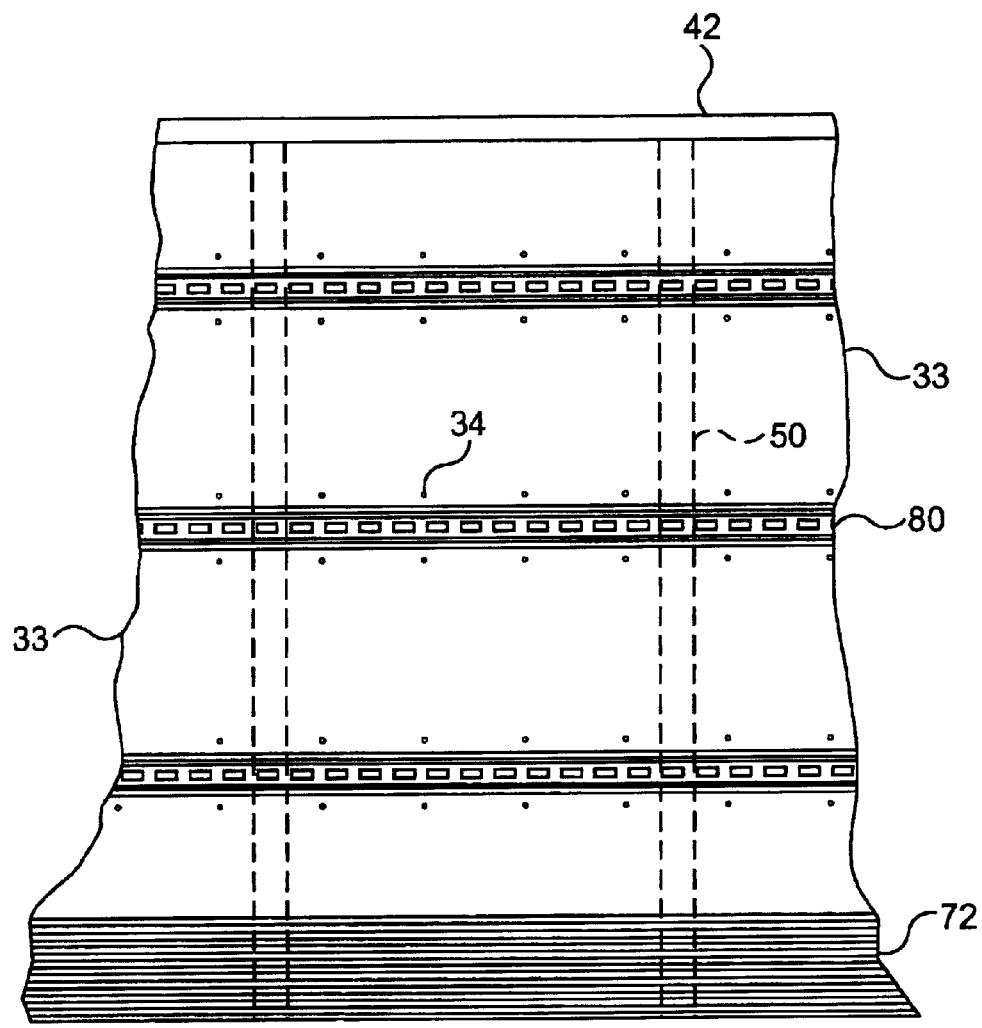
FIG. 18 is a partial plan view of a side wall constructed in accordance with an embodiment of the present invention.

Although the discussion above provides examples in which rectangular liner panels are vertically oriented, it should also be understood that the panels may comprise various shapes and may be horizontally oriented. Referring to FIG. 18, for example, four horizontally aligned liner panels 33 are disposed between the trailer floor and top rail 42. Three logistic tracks 80 run horizontally along the trailer side wall and are attached to vertical posts 50 (shown in phantom). Fasteners 34 attach the liner panels and the logistic tracks.

As in the examples above describing vertically-aligned panels, it should be understood that various liner panel configurations are possible, as are various arrangements between adjacent liner panels and between liner panels and logistic tracks. Referring to FIGS. 19 and 20, for example, the side wall includes a plurality of vertical posts 50 to which an outer skin 21 is attached on one side and two horizontally aligned inner liner panels 33 are attached on the other. A single logistic track 80 runs between the two liner panels. At the edges of the liner panels adjacent top and bottom rails 42 and 22, facer 35 on each panel folds over the edge of backer 36. In the illustrated embodiment, the overhang does not fold around to the backer's opposite side, but it should be understood that this may be done. At the panel edges adjacent the logistic track, the facer overhangs fold outward and are attached to the logistic track flanges by screws 34.

Figure 21:
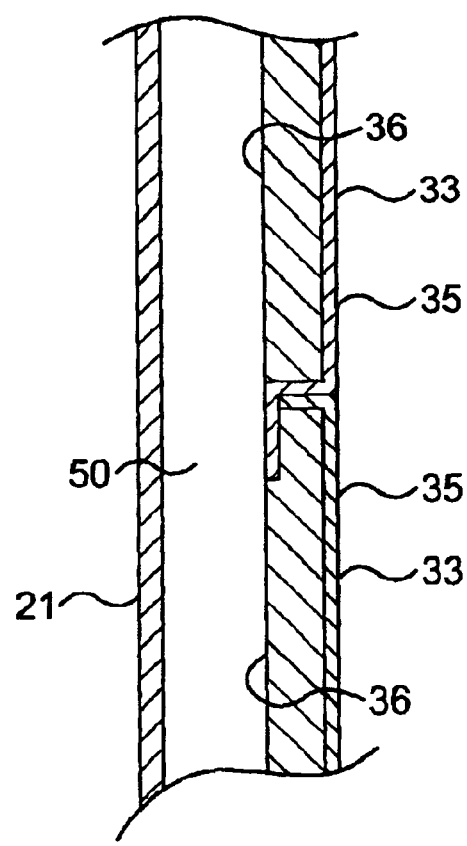
FIG. 21 is a partial cross-sectional view of a side wall constructed in accordance with an embodiment of the present invention.

Referring to FIG. 21, the horizontal panels may be used without a logistic track. The upper panel's facer overhang folds outward away from its backer to receive the lower panel. The lower panel facer folds over the upper edge of its backer but does not wrap around to the opposite side. A notch formed along the backer's opposite side receives the upper panel's folded-out overhang. In another embodiment, the second panel is not notched, and the folded-out portion of the first panel's overhang simply extends behind the second panel. The upper and lower panels may be attached to vertical posts 50 by screws (not shown) extending through the panels and the posts. In a still further embodiment, a single liner panel covers the entire trailer side wall inner surface (although it should be understood that this includes constructions in which the side wall includes one or more scuff bands) and is attached to a plurality of vertical or horizontal posts. The single panel includes a backer and a facer as described above, and the facer may overhang the backer along any of the backer's edges and fold over the edges in any of the configurations described herein.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore it is contemplated that any and all such embodiments are included in the present invention as may fall within the literal and equivalent scope of the appended claims.

What is claimed is:

1. A cargo transport structure for use with a motorized vehicle so that when transported by the motorized vehicle, the structure extends from proximate the motorized vehicle and away from the motorized vehicle over at least one pair of wheels, said structure comprising:
    a floor; and
    a side wall extending vertically upward from a side edge of said floor, said side wall having
        an exterior surface,
        a plurality of adjacent liner panels inward of and spaced apart from said exterior surface, wherein
            each said liner panel has a stiff backer and a tough facer attached to an inward side of said backer so that said facer at least partially defines a planar inner surface of said side wall, and
            said facer defines an overhang portion that wraps around a vertical edge of said backer and covers an edge surface of said backer that is perpendicular to said inner surface, and
        a plurality of elongated vertical posts disposed between said liner panels and said exterior surface, wherein each said post has a generally planar longitudinal inwardmost surface,
        wherein each pair of adjacent said liner panels is attached to a respective said vertical post disposed between said adjacent liner panels so that said liner panels of said pair of adjacent liner panels extend over said inwardmost surface of said respective vertical post.

2. The cargo transport structure as in claim 1, wherein liner panels of each said pair of said adjacent liner panels abut each other.

3. The cargo transport structure as in claim 1, wherein said overhang portion extends beyond said edge surface and wraps around said edge surface so that said facer covers at least a portion of the side of said backer opposite said inward side.

4. The cargo transport structure as in claim 3, including, for each liner panel of each said pair of adjacent liner panels, a plurality of fasteners extending through said backer proximate said edge, and through said facer on both sides of said backer, and into said respective vertical post so that said fasteners secure said liner panel to said respective vertical post.

5. A cargo transport structure for use with a motorized vehicle so that when transported by the motorized vehicle, the structure extends from proximate the motorized vehicle and away from the motorized vehicle over at least one pair of wheels, said structure comprising:
    a floor; and
    a side wall extending vertically upward from a side edge of said floor, said side wall having
        an exterior surface,
        a plurality of adjacent rectangular liner panels inward of and spaced apart from said exterior surface, wherein
            each said liner panel has a stiff backer and a tough facer attached to an inward side of said backer so that said facer at least partially defines a planar inner surface of said side wall, and
            said facer defines an overhang portion that wraps around a vertical edge of said backer and covers an edge surface of said backer that is perpendicular to said inner surface, and
        a plurality of elongated vertical posts disposed between and attached to said liner panels and said exterior surface, wherein each said post has a generally planar longitudinal inwardmost surface,
        wherein each pair of adjacent said liner panels is attached to a respective said vertical post disposed between said adjacent liner panels so that said liner panels of said pair of adjacent liner panels abut each other and extend over said inwardmost surface of said respective vertical post.

6. A cargo transport structure for use with a motorized vehicle so that when transported by the motorized vehicle, the structure extends from proximate the motorized vehicle and away from the motorized vehicle over at least one pair of wheels, said structure comprising:
- a floor; and
- a wall above said floor, said wall having
  - an exterior surface, and
  - a liner panel inward of and spaced apart from said exterior surface, wherein
    - said liner panel has a stiff backer and a tough facer attached to an inward side of said backer so that said facer at least partially defines a planar inner surface of said side wall, and
    - said facer defines an overhang portion that extends beyond an edge of said backer.

7. The cargo transport structure as in claim 6, wherein said overhang portion folds over said edge of said backer and covers an edge surface of said backer that is perpendicular to said inner surface.

8. The cargo transport structure as in claim 7, wherein said overhang portion ends at said edge surface.

9. The cargo transport structure as in claim 7, wherein said overhang portion extends beyond said edge surface and wraps around said edge surface so that said facer covers at least a portion of the side of said backer opposite said inward side.

10. The cargo transport structure as in claim 6, wherein said wall is a side wall.

11. The cargo transport structure as in claim 6, wherein said wall is vertical.

12. A cargo transport structure for use with a motorized vehicle so that when transported by the motorized vehicle, the structure extends from proximate the motorized vehicle and away from the motorized vehicle over at least one pair of wheels, said structure comprising:
- a floor; and
- a side wall extending vertically upward from a longitudinal edge of said floor, said side wall having
  - an exterior surface, and
  - a liner panel inward of and spaced apart from said exterior surface, wherein
    - said liner panel has a stiff backer and a tough facer attached to an inward side of said backer so that said facer at least partially defines a planar inner surface of said side wall, and
    - said facer defines an overhang portion that wraps around a vertical edge of said backer and partially covers an edge surface of said backer that is perpendicular to said inner surface.

13. The cargo transport structure as in claim 12, wherein said side wall includes a plurality of spaced apart vertical posts disposed between said exterior surface and said liner panels and wherein each pair of adjacent liner panels is attached to a respective said vertical post between said adjacent liner panels.

14. The cargo transport structure as in claim 13, wherein each said vertical post defines stepped-down flanges on opposite sides of a front face of said post, and wherein said adjacent liner panels are attached to said flanges.

15. The cargo transport structure as in claim 13, including a fastener extending through said facer and said backer proximate said edge and into said post so that said fastener secures said liner panel to said post, said fastener having a shaft portion and a head portion that is wider than said shaft portion.

16. The cargo transport structure as in claim 15, wherein said backer defines an area depressed from said inward side of said backer,
said facer deflects into said area so that said facer and said backer define a recess at said inner surface, and
said shaft portion extends through said backer and said facer so that said head portion is received in said recess and abuts said facer.

17. A cargo transport structure for use with a motorized vehicle so that when transported by the motorized vehicle, the structure extends from proximate the motorized vehicle and away from the motorized vehicle over at least one pair of wheels, said structure comprising:
- a floor; and
- a side wall extending vertically upward from a longitudinal edge of said floor, said side wall having
  - an exterior surface,
  - a liner panel inward of and spaced apart from said exterior surface, wherein
    - said liner panel has a stiff backer and a tough facer attached to an inward side of said backer so that said facer at least partially defines a planar inner surface of said side wall, and
    - said facer defines an overhang portion that extends beyond an edge of said backer,
  - an elongated post between and attached to said exterior surface and said liner panel, and
  - a fastener extending through said facer and said backer proximate said edge and into said post so that said fastener secures said liner panel to said post, said fastener having a shaft portion and a head portion that is wider than said shaft portion, wherein
    - said backer defines an area depressed from said inward side of said backer,
    - said facer deflects into said area so that said facer and said backer define a recess at said inner surface, and
    - said shaft portion extends through said backer and said facer so that said head portion is received in said recess and abuts said facer.

18. The cargo transport structure as in claim 17, including a plurality of said fasteners.

19. The cargo transport structure as in claim 18, wherein said fasteners are attached at a plurality of respective said recesses.

20. The cargo transport structure as in claim 18, wherein said recess is a continuous elongated recess in which said plurality of fasteners are received.

21. The cargo transport structure as in claim 17, including a plurality of spaced apart, vertical said posts, wherein each pair of adjacent said liner panels is attached to a respective said vertical post between said adjacent liner panels.

22. A cargo transport structure for use with a motorized vehicle so that when transported by the motorized vehicle, the structure extends from proximate the motorized vehicle and away from the motorized vehicle over at least one pair of wheels, said structure comprising:
- a floor; and
- a side wall extending vertically upward from a longitudinal edge of said floor, said side wall having
  - an exterior surface,
  - a liner panel inward of and spaced apart from said exterior surface, wherein
    - said liner panel has a stiff backer and a tough facer attached to an inward side of said backer so that said facer at least partially defines a planar inner surface of said side wall, and
    - said facer defines an overhang portion that extends beyond an edge of said backer, and an elongated post between and attached to said exterior surface and said liner panel so that said backer abuts said post, wherein fasteners extend through said facer and said backer into said post to secure said liner panel to said post, and wherein each said fastener has a shaft portion and a head portion that is wider than said shaft portion.

23. The cargo transport structure as in claim 22, wherein said backer and said facer define a recess at said inner surface at which said shaft portion extends through said backer and said facer so that said head portion is received in said recess.

24. The cargo transport structure as in claim 22, wherein said recess comprises a plurality of discrete recesses in which respective said fasteners are received.

25. The cargo transport structure as in claim 24, wherein said backer defines an area depressed from said inward side of said backer, and said facer deflects into said area so that said facer and said backer define said recess.

* * * * *

UNITED STATES PATENT AND TRADEMARK OFFICE
CERTIFICATE OF CORRECTION

PATENT NO.      : 6,923,493 B2
DATED           : August 2, 2005
INVENTOR(S)     : Mark A. Buchholz et al.

It is certified that error appears in the above-identified patent and that said Letters Patent is hereby corrected as shown below:

<u>Column 5,</u>
Line 6, after "trailer 10." please add the sentence -- It should be understood that scuff band 70 may not necessarily be coplanar with the inner side wall surface of trailer 10. --.

Signed and Sealed this

Thirteenth Day of December, 2005

JON W. DUDAS
*Director of the United States Patent and Trademark Office*